Figure 6:
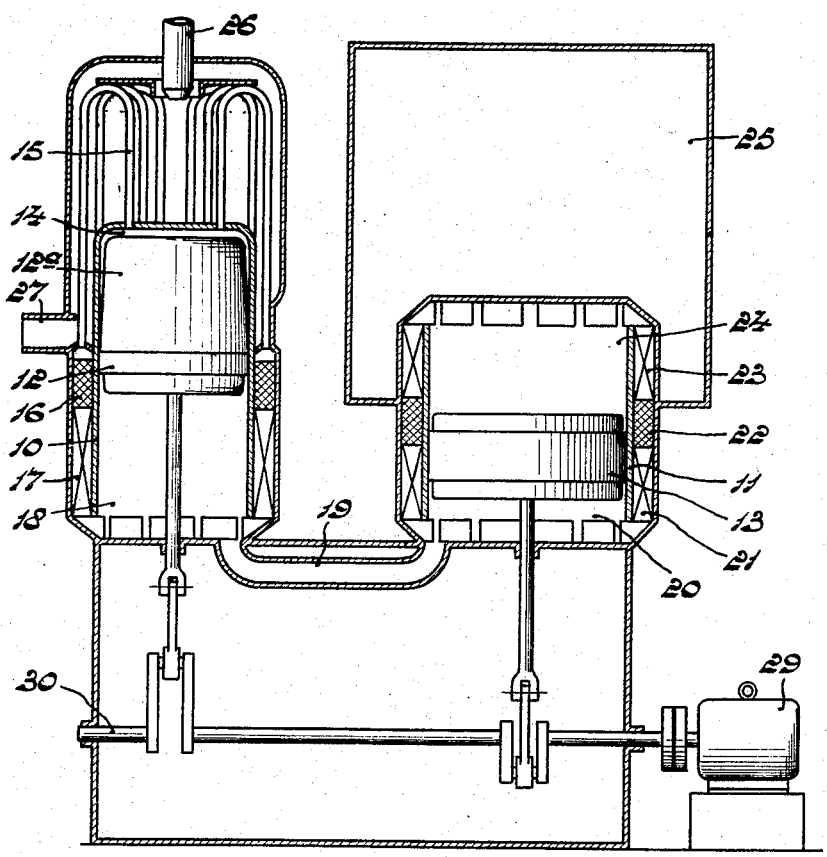

Nov. 3, 1953    C. O. JONKERS ET AL    2,657,552
HOT GAS ENGINE REFRIGERATOR
Filed April 17, 1951    3 Sheets-Sheet 1
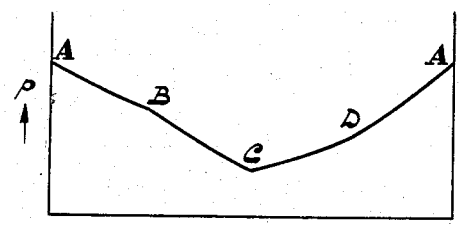
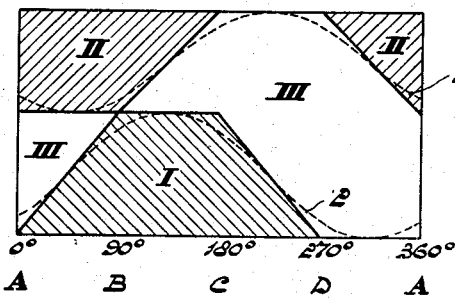
Fig.1
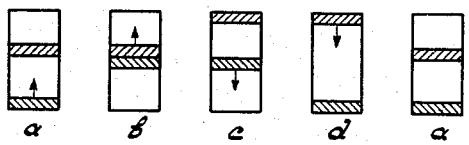
Fig.2
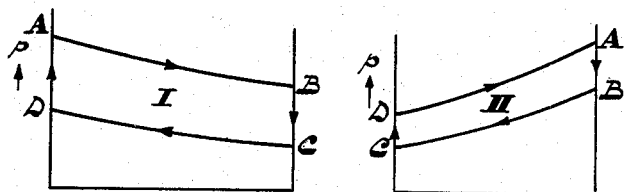
Fig.3    Fig.4
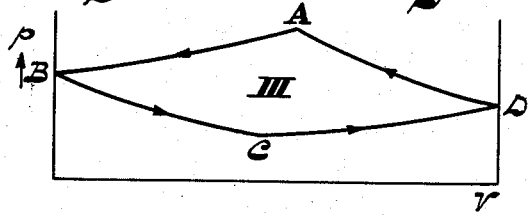
Fig.5
INVENTORS
CORNELIUS OTTO JONKERS
JACOB WILLEM LAURENS KÖHLER
BY  Fred M Vogel
AGENT Nov. 3, 1953  C. O. JONKERS ET AL  2,657,552
HOT GAS ENGINE REFRIGERATOR
Filed April 17, 1951  3 Sheets-Sheet 2

INVENTORS
CORNELIUS OTTO JONKERS
JACOB WILLEM LAURENS KÖHLER
BY Fred M Vogel
AGENT Nov. 3, 1953

C. O. JONKERS ET AL 2,657,552

HOT GAS ENGINE REFRIGERATOR

Filed April 17, 1951

3 Sheets-Sheet 3

INVENTORS
CORNELIUS OTTO JONKERS
JACOB WILLEM LAURENS KOHLER

BY

AGENT

Patented Nov. 3, 1953

2,657,552

UNITED STATES PATENT OFFICE 2,657,552

HOT GAS ENGINE REFRIGERATOR

Cornelius Otto Jonkers and Jacob Willem Laurens Köhler, Eindhoven, Netherlands, assignors to Hartford National Bank and Trust Company, Hartford, Conn., as trustee Application April 17, 1951, Serial No. 221,366

Claims priority, application Netherlands June 10, 1950

4 Claims. (Cl. 62—136)

This invention relates to closed system refrigerators containing an amount of gas of invariable chemical composition as the working medium.

Closed system refrigerators containing an amount of gas of invariable chemical composition as the working medium are known. Such refrigerators include, for example, refrigerators operating on the reversed hot-gas engine principle. Such refrigerators are driven by a separate motor, for example by an electric motor or a motor utilising benzene as fuel. The total amount of energy required for the refrigerator and consisting of thermodynamic energy to overcome friction is thus supplied as mechanical energy.

The object of the invention is to provide a refrigerator in which a great proportion of the energy required for driving the machine may be supplied as thermal energy, whereas the mechanical energy supplied is comparatively small, said mechanical energy being substantially used to reciprocate the displacers provided in the refrigerator. The term "displacer" is to be understood to mean a piston-like body, the two end surfaces of which each act upon a space of variable volume, the pressures in the two spaces being substantially the same.

By supplying the required energy substantially as thermal energy instead of mechanical energy, the output of the refrigerator may be improved, since in this case it is not necessary, as is the case with electric motors and motors utilizing benzene as fuel that the thermal energy should first be converted into mechanical energy before being supplied to the refrigerator.

According to the invention, a closed system refrigerator containing an amount of gas of invariable chemical composition as the working medium is characterised in that it comprises two displacers adapted to be provided with a substantially harmonic motion and with a constant phase difference, one working surface of one displacer acting upon the volume of a hot space and the other working surface upon the volume of a space at medium temperature, and one working surface of the other displacer also acting upon the volume of the space at medium temperature and its other surface upon the volume of a cold space, the variations in volume of the hot space leading with respect to those of the cold space, the sum of said three volumes being substantially constant, and the hot space and the cold space each communicating by way of a heater, a regenerator and a cooler with the space at medium temperature, the value of the expression $$v \cdot \frac{T_k}{T_v}$$

where $v$ is the maximum volume of the cold space divided by the maximum value of the hot space, $T_k$ is the absolute temperature of the space at medium temperature and $T_v$ is the absolute temperature of the cold space, the value of $v$ being between 0.5 and 2.5.

In the machine according to the invention, the temperature of the hot space is comparatively high, for example, 900° absolute. The space at medium temperature has a considerably lower temperature, for example, 325° absolute, while the temperature of the cold space is still lower, for example lower than 273° absolute.

The term "heater" is to be understood to mean a heat exchanger by means of which thermal energy is supplied to the working medium in the refrigerator. Due to the supply of thermal energy to the heater, which is provided in the vicinity of the hot space, the hot space is maintained at high temperature. In the vicinity of the cold space is another heat exchanger by means of which thermal energy is supplied (at a comparatively low temperature) to the working medium in the refrigerator and this heat exchanger will also be referred to hereinafter as a heater.

The term "cooler" is to be understood to mean a heat exchanger by means of which thermal energy is extracted from the working medium.

It has been found that the refrigerator according to the invention yields satisfactory results if the product $$v \cdot \frac{T_k}{T_v}$$

is between 0.5 and 2.5.

Mechanical energy may be supplied to the refrigerator according to the invention by a comparatively small motor which substantially need supply only that energy which is required to overcome the frictional resistance to the reciprocating movements of the displacers. This amount of energy is comparatively small since each of the two displacers acts upon the volume of two spaces which are invariably in free communication with one another.

In one advantageous embodiment of the invention, the two displacers are connected to a common crank on a crank shaft, the two displacers being substantially at right angles to one another, the spaces adjacent the crank shaft being parts of the space at medium temperature. In this embodiment of the invention, it is possible to reduce the clearance spaces, while furthermore the refrigerator is better adapted to be balanced mechanically. In addition, the distance between the hot space and the cold space may be made comparatively great.

Figure 7:
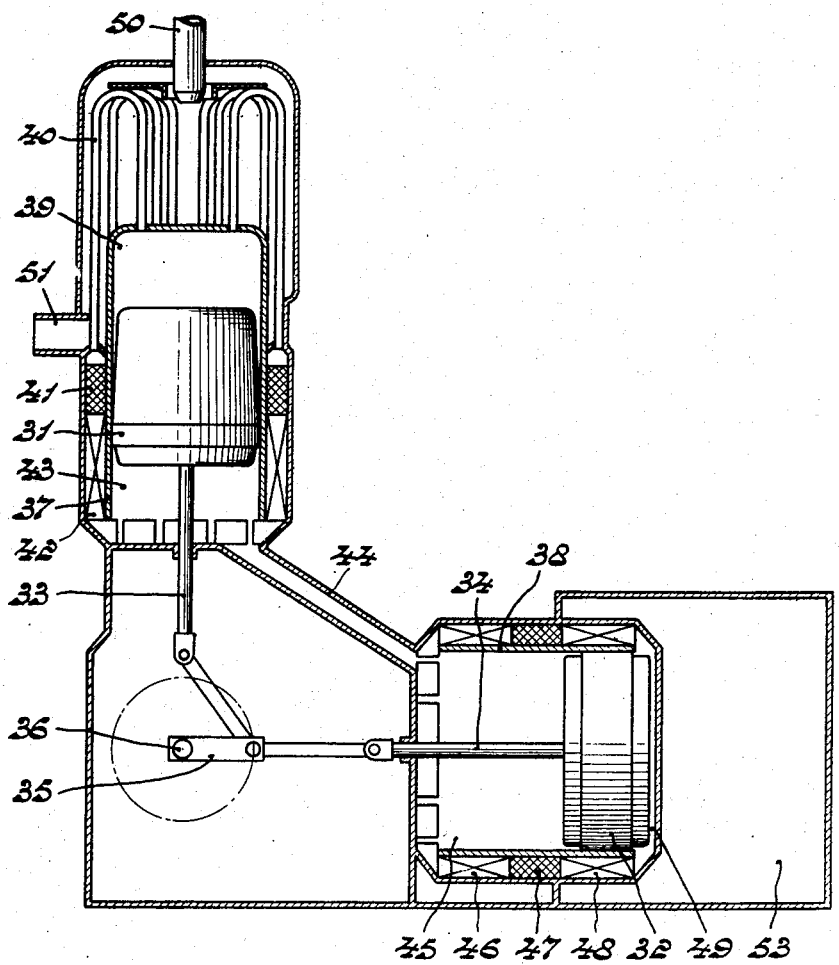

The invention will now be explained more fully by reference to the accompanying diagrammatic drawings, given by way of example, in which:

Figs. 1 to 5 show some diagrams to explain the operation of the refrigerator shown in Fig. 7, a second embodiment of a refrigerator according to the invention being shown in Fig. 6.

The displacers in the refrigerator according to the invention perform a substantially harmonic motion, so that the positions of the displacers plotted against the crank position in degrees if infinitely long connecting rods are assumed gives a substantially sinusoidal curve.

In Fig. 1, the abscissa indicates the variation of crank position in degrees and the ordinates the variations of the volumes of the spaces and the pressure P of the working medium. In this figure the sinusoidal broken line indicates the variation in positions of the displacers. The broken line 1 indicates the variation in position of the displacer acting upon the volume of the hot space and the broken line 2 of the displacer acting upon the volume of the cold space. The pressure variation is shown by the lines ABCDA in Fig. 1. The clearance space in the refrigerator is assumed to be zero. The cross-hatched surface I roughly indicates the variations in volume of the cold space, the surfaces II, those of the hot space and the surfaces III, those of the space at medium temperature. The pressure P is maximum at crank angles of 0° and 360° and minimum at 180°.

Fig. 2 shows the relative positions of the two displacers in a common cylinder with difference in crank angles of 90°. These positions correspond to the points A, B, C, D in Fig. 1. As may be seen from this figure, expansion occurs upon movement of the displacers from position $a$ to position $b$ and from position $b$ to position $c$ and compression occurs upon movement of the displacers from position $c$ to position $d$ and from position $d$ to position $a$.

Figs. 3, 4 and 5 show diagrammatically the pressure volume diagrams of the cold space, the hot space and the space at medium temperature, respectively. In the said figures, the volumes of the spaces and the pressure in the spaces are plotted as the abscissae and the ordinates, respectively. The maximum volume of the space of medium temperature is equal to the sum of the volumes of the hot space and the cold space, so that the base of the diagram of Fig. 5 is equal to the sum of those of Figs. 3 and 4.

Fig. 1 shows that in the refrigerator according to Fig. 7, the ratio $v$ between the maximum volumes of the cold space and the hot space is equal to 1.2. The temperature of the hot space is 810° absolute, that of the space at medium temperature is 325° absolute and that of the cold space 250° absolute. The product $$v \cdot \frac{T_k}{T_v} = 1.2 \cdot \frac{325}{250} = 1.56$$

This refrigerator has a useful refrigerating capacity of 1,000 watts, the thermal energy supplied being 2,000 watts and the mechanical energy supplied 400 watts.

The diagrams shown in Figures 1 to 5 are theoretical, the actual diagrams having a slightly different form, for example since motion of the displacers is only approximately harmonic. Further, the pressure variation will slightly differ from that shown in Fig. 1.

Fig. 6 shows one embodiment of the refrigerator according to the invention. Displacers 12 and 13 reciprocate in cylinders 10 and 11 respectively. The displacer 12 is provided with a cap 12a, in order to decrease the thermal loss from the hot space to the space at medium temperature and to keep cool the surface of the displacer 12 making contact with the wall of cylinder 10. The space above the displacer 12 is the hot space 14, which is in free communication with a space 18 by way of a conduit heater 15, a regenerator 16 and a cooler 17. The space 18, in turn, freely communicates by way of a channel 19 with a space 20. The spaces 18, 19 and 20 jointly constitute the space of medium temperature. The space 20 communicates by way of a cooler 21, a regenerator 22 and a freezer 23 with a cold space 24. The cold space 24 and the freezer 23 are provided within a space 25 to be cooled.

Thermal energy is supplied to the hot space 14 with the use of a burner 26. The combustion gases leave the heater at 27. The combustion air for the burner 26 may be preheated by the said combustion gases in a device (not shown). The displacers 12 and 13 are connected with the use of driving rods to a crank shaft 30 and move with a phase difference of 120°, the variations in volume of the hot space 14 leading in phase with respect to those of the cold space 24. The movement of the displacers is effected with the use of an electric motor 29, which substantially needs supply only the energy required to reciprocate the displacers. This amount of energy is comparatively small as a result of the fact that each of the two displacers is subject, at each end, to substantially the same pressure. In this machine, the temperature of the hot space $T_w$ is 900° absolute, the temperature of the space of medium temperature $T_k$, 300° absolute and the temperature of the cold space $T_v$, 280° absolute. The ratio between the maximum volumes of the cold space and the hot space, viz. the factor $v$, is equal to 1.6 Thus, in this machine the product $$v \cdot \frac{T_k}{T_v} = .16 \times \frac{300}{280} = 1.71$$

Figure 2A:
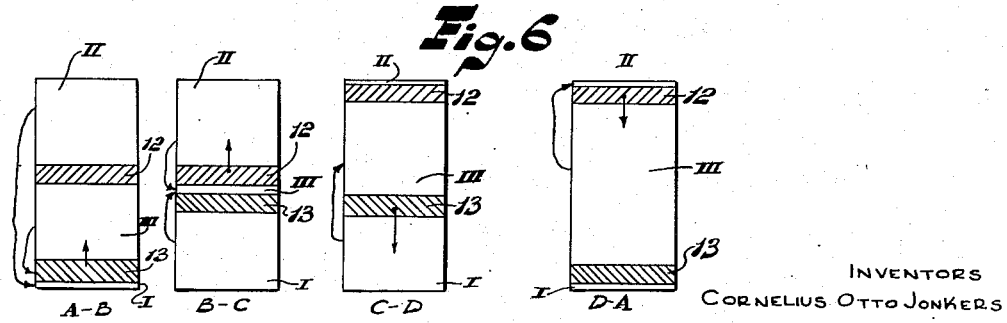

Fig. 2a is a diagram which shows the sequential flow of the working medium for every 90° turn for a full cycle of crank shaft 30. The flow of the working medium for the first 90° of a crank revolution is shown is Fig. 1 and period A—B in Fig. 2a. During the period A—B (Fig. 1) the working medium flows from the hot space II (14) through the heater 15, regenerator 16, cooler 17, duct 19, the cooler 21, regenerator 22 and freezer 23 to the cold space I (24). During the same period some of the working medium flows also from the medium space III (18, 19, 20) through the cooler 21, regenerator 22 and freezer 23 to the cold space I (24). During the period B—C the displacer 13 is at rest or almost at rest, while the displacer 12 moves in upward direction. During this period the working medium flows from the hot space II (24) through the heater 15, regenerator 16 and cooler 17 to the medium space III (18, 19, 20), while also some of the working medium flows from the cold space I (2) to the above mentioned medium space III. During the period C—D the displacer 12 is in its uppermost position at rest or almost at rest, while the displacer 13 moves in an upward direction (Fig. 6), thus diminishing the cold space I (24). During this period, the working medium flows from the cold space I through the freezer 23, regenerator 22 and cooler 21 to the medium space III (18, 19, 20). During the period D—A, the displacer 13 is in its uppermost position at rest or almost at rest (Fig. 6), while the displacer 12 moves in a downward direction. During this period, the working medium flows from the medium space III (18, 19, 20) through the cooler 17, regenerator 16 and heater 15 to the hot space II (14).

Such a refrigerator may be employed in air-conditioning installations.

However, by different proportioning of the refrigerator, it is also possible to construct refrigerators in one stage to achieve a temperature of 150° absolute or lower.

The refrigerator shown in Fig. 7 achieves a temperature of 250° absolute. This refrigerator is constructed substantially in accordance with the data of the diagrams shown in Figs. 1 to 5.

This refrigerator comprises two displacers 31 and 32 respectively, which are at right angles to one another. The displacers are connected by rods 33 and 34 to a common crank 35 provided on a crank-shaft 36. The displacers 31 and 32 are adapted to reciprocate in cylinders 37 and 38 respectively. A space 39 above the displacer 31, provided with a cap, in the hot space of the refrigerator and this hot space is in free communication by way of a conduit heater 40, a regenerator 41 and a cooler 42 with a space 43 under the displacer. The space 43 freely communicates by way of a channel 44 with a space 45 at the left-hand side of the displacer 32. The space 43, the channel 44 and the space 45 jointly form the space at medium temperature. The junction channel 44 may be of small volume due to the particular arrangement of the displacers, so that the clearance space of the refrigerators is small. Furthermore, with this arrangement, the distance between the hot space and the cold space is comparatively great. The space 45, in turn, freely communicates by way of a cooler 46, a regenerator 47 and a cooler 48 with a cold space 49.

The hot space is supplied with thermal energy with the use of a burner 50, so that this space is maintained at high temperature, for example, 810° absolute. The combustion gases leave the heater at 51. The cold space 49 and the cooler 48 are provided within a space 53, required to be kept at low temperature. The refrigerator is driven by a driving mechanism (not shown) in such manner that the variations in valume of the hot space 39 lead in phase with respect to those of the freezing space 49. Furthermore, the ratio between the maximum volumes of the hot and the cold spaces $v$ and the ratio between the absolute temperatures of the space at medium temperature $T_k$ and the cold space $T_v$ are chosen such that the product $$v \cdot \frac{T_k}{T_v}$$

is comprised between 0.5 and 2.5.

In this machine, as stated above with reference to Figs. 1 to 5, the temperature of the cold space is 250° absolute and the temperature of the space at medium temperature is 325° absolute.

The factor $v$ is equal to 1.2, so that the product $$v \cdot \frac{T_k}{T_v}$$

is equal to 1.56. The refrigerator shown in Figure 7 affords the advantage that it may readily be balanced mechanically. The value of the factor $v$ is very important. It may be controlled by the extent of the stroke or by the diameter of the displacers. The refrigerator output may be improved by utilizing, for example, hydrogen or helium instead of air as the working medium. In this case, the values previously mentioned for the mechanical and thermal energy required to obtain a given refrigerating capacity and in which air as the working medium was considered become more favorable.

According to the invention the greatest amount of power necessary for giving cold by the refrigerator is delivered by caloric energy. For this reason the hot space 14 is connected by heater 15, regenerator 16 and cooler 17 with the cold space 18. It will, however, be necessary to deliver a certain amount of mechanical or electrical energy in order to overcome the mechanical losses of the apparatus, for instance to overcome the friction losses of the displacers 12 and 13. For this purpose, a rather small electric motor 29 is present, which delivers only an output which is necessary to overcome the above mentioned losses.

Since the apparatus described for instance in Fig. 6 is not workable under all conditions applicant has worked out a formula which expresses under what conditions the device according to the invention is workable with a desired output. One who knows the desired temperature of the hot and freezing spacing respectively may construct a refrigerator according to this invention. Thus, the factor $v$ is the maximum value of the cold space divided by the maximum value of the hot space. If, for instance the temperature of the hot space is 1000° Kelvin, which will be in most cases the fact with the usual burners, and if the desired temperature of the freezing space is for instance 100° Kelvin, the maximum volume of the cold space must be between 0.05 and 0.25 times the hot space. Thus, by use of this formula one may build a refrigerator according to the present invention.

What we claim is:

1. A closed system refrigerator having an amount of gas of invariable chemical composition as the working medium comprising at least two displacers adapted to move with a substantially harmonic motion and with a constant phase difference in relation to each other, each of said displacers being provided with two working surfaces, one working surface of one displacer defining one end of a hot-space and acting upon a volume of gas in said hot space, the other working surface of said one displacer defining one end of a space of intermediate temperature and acting upon a volume of gas of intermediate temperature, one working surface of the other displacer defining the other end of said space of intermediate temperature and acting upon a volume of gas of said intermediate temperature, the other working surface of said other displacer defining one end of a cold space and acting upon a volume of gas in said cold space, the variations in volume of gas in hot space leading in relation to the variations in volume of gas in said cold space, the sum of said volumes being substantially constant, said hot space communicating with said space of intermediate temperature by means of a heater, regenerator and cooler, and said cold space communicating with said space of intermediate temperature by means of a freezer, regenerator and cooler.

2. A closed system refrigerator as claimed in claim 1 wherein the value of the expression $$v \times \frac{T_k}{T_v}$$

is between 0.5 and 2.5, where $v$ is the maximum volume of the cold space divided by the maximum volume of the hot space, $T_k$ is the absolute temperature of the space at an intermediate temperature and $T_v$ is the absolute temperature of the cold space.

3. A closed system refrigerator having an amount of gas of invariable chemical composition as the working medium comprising at least two displacers connected to a common crank on a crank shaft, said displacers being arranged subtsantially perpendicular to each other and being adapted to move with a substantially harmonic motion and with a constant phase difference in relation to each other, each of said displacers being provided with two working surfaces, one working surface of one displacer defining one end of a hot space and acting upon a volume of gas in said hot space, the other working surface of said one displacer defining one end of a space of intermediate temperature and acting upon a volume of gas of intermediate temperature, one working surface of the other displacer defining the other end of said space of intermediate temperature and acting upon said volume of gas of intermediate temperature, the other working surface of said other displacer defining one end of a cold space and acting upon a volume of gas in said cold space, the variations in volume of gas in the hot space leading in relation to the variations in volume of gas in said cold space, the sum of said volumes being substantially constant, said hot space communicating with said space of intermediate temperature by means of a heater, regenerator and cooler, and said cold space communicating with said space of intermediate temperature by means of a freezer, regenerator and cooler.

4. A closed system refrigerator as claimed in claim 3 wherein the value of the expression $$v \times \frac{T_k}{T_v}$$

is between 0.5 and 2.5, where $v$ is the maximum volume of the cold space divided by the maximum volume of the hot space, $T_k$ is the absolute temperature of the space at an intermediate temperature and $T_v$ is the absolute temperature of the cold space.

CORNELIUS OTTO JONKERS.
JACOB WILLEM LAURENS KÖHLER.

References Cited in the file of this patent

UNITED STATES PATENTS

| Number | Name | Date |
|---|---|---|
| 1,275,507 | Vuilleumier | Aug. 13, 1918 |
| 1,730,580 | Lundgaard | Oct. 8, 1929 |
| 2,484,392 | Van Heeckeren | Oct. 11, 1949 |
| 2,486,081 | Van Weenen | Oct. 25, 1949 |